March 19, 1940.                H. C. GRANT, JR                    2,194,442
                              AIRCRAFT FLOTATION GEAR
                              Filed Jan. 8, 1938           3 Sheets-Sheet 1
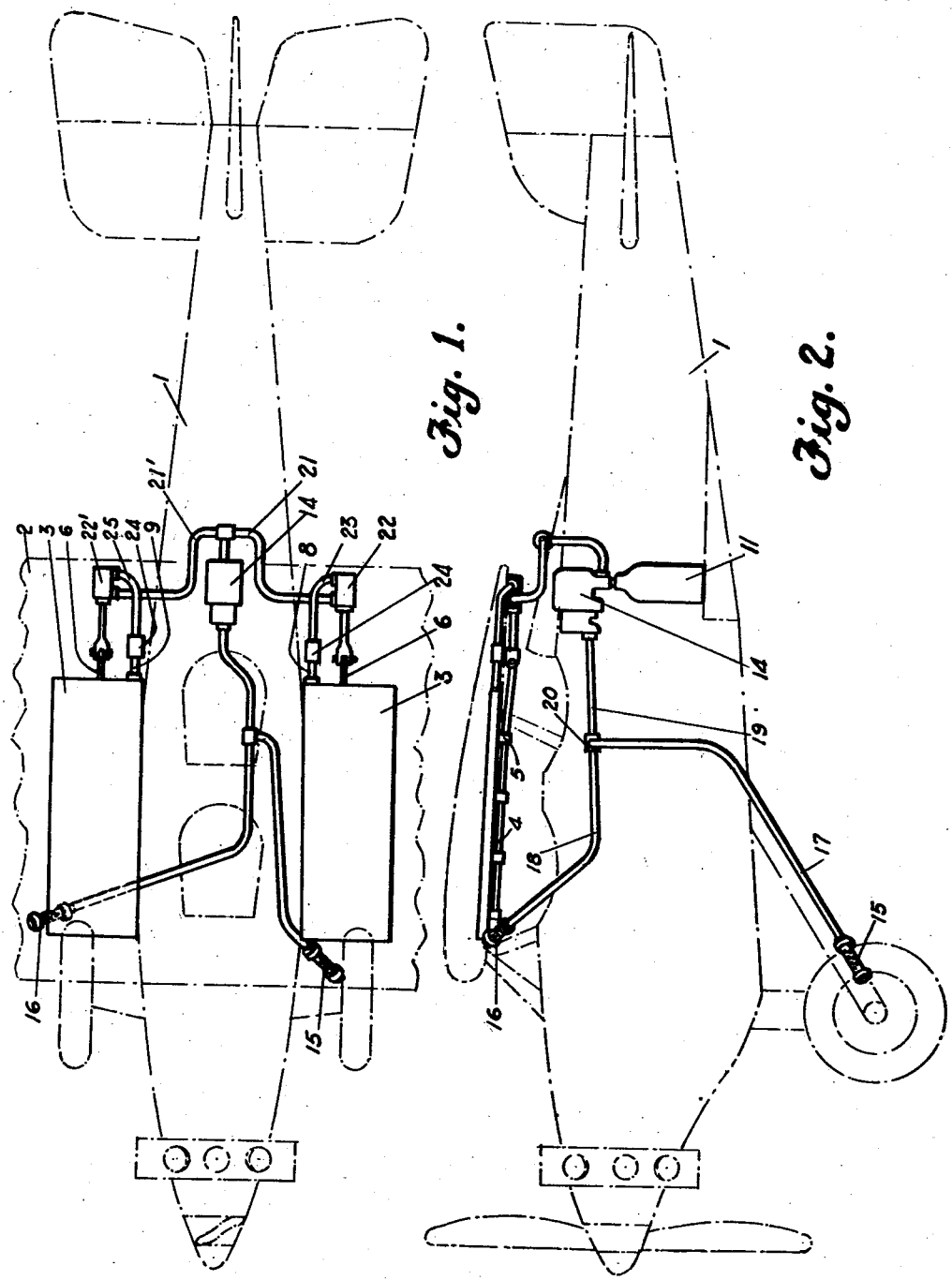
INVENTOR
*Harry C. Grant, Jr.*
BY
*J. William Carson*
ATTORNEY March 19, 1940.  H. C. GRANT, JR  2,194,442
AIRCRAFT FLOTATION GEAR
Filed Jan. 8, 1938  3 Sheets-Sheet 2

INVENTOR
Harry C. Grant, Jr.
BY
J. William Carson
ATTORNEY

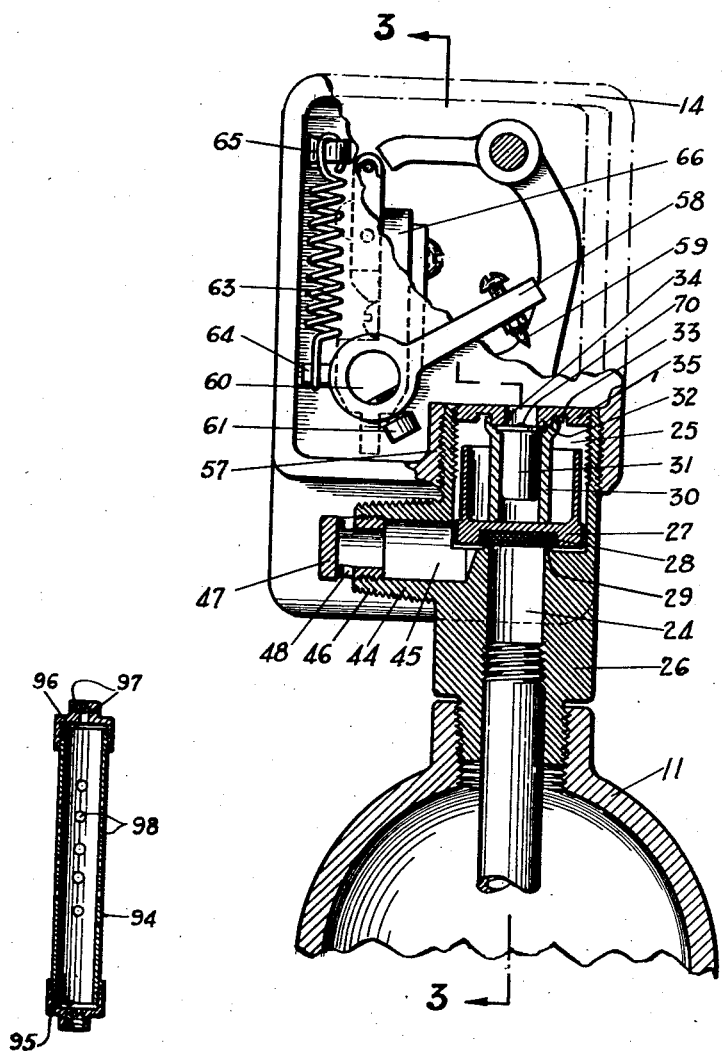

Patented Mar. 19, 1940

2,194,442

UNITED STATES PATENT OFFICE 2,194,442

AIRCRAFT FLOTATION GEAR

Harry C. Grant, Jr., New York, N. Y., assignor to Walter Kidde & Company, Inc., Bloomfield, N. J., a corporation of New York Application January 8, 1938, Serial No. 184,049

7 Claims. (Cl. 221—73.5)

The present invention relates to aircraft flotation gear of the type which comprises an arrangement wherein one or more inflatable bags are provided on the aircraft and are adapted to be inflated automatically with a buoyant fluid medium when the aircraft descends upon a body of water. When inflated, the bags form buoyant floats for supporting the aircraft and prevent it from sinking.

Aircraft flotation apparatus of the type referred to, and which is currently in quite general use, comprises a container in which the buoyant fluid is stored under pressure, and a releasing or control head secured to the container including a frangible disc closure and a closure piercing member which becomes dynamically operative as soon as the aircraft comes in contact with a body of water, thus releasing the buoyant medium; said piercing member being normally energized by a coiled spring held in restraint by a series of interengaging levers which successively reduce the operating force to a point where the outermost lever of the series is releasable by a small operating pressure developed upon immersion of an actuator in water. Releasing or control heads of this type usually include a manual reset for the spring energized piercing member and the lever system, and at the same time take the form of an integrally inviolate structure.

Such automatically operable apparatus, although it has proved satisfactory, is complicated and costly, requiring great care and accuracy in the manufacture of the numerous parts as well as careful handling in installation and maintenance; and there has been a progressive tendency to develop ever more reliable, quick acting and compact systems, none the less automatically operable, but of simpler and more rugged construction.

It is accordingly an object of the present invention to provide an automatically operable aircraft flotation gear which is of simple and rugged construction, and which is at the same time reliable, quick acting and compact.

It is likewise an object of the invention to provide an aircraft flotation gear which becomes operable as soon as the aircraft alights upon water, in its upright or in an inverted position.

Another object of the invention is to provide an aircraft flotation gear of a simplified and economical yet rugged construction which possesses a high degree of reliability.

A further object is to provide an aircraft flotation gear which calls for a replacement of essential parts after each operation in order to regain its operability.

A still further object is to provide an aircraft flotation gear which will utilize the stored pressure of a fluid medium in effecting the release of the medium.

A further object of the invention is to provide a flotation gear which is rugged and yet sensitive in its response to its actuating conditions; i. e., which will become operative as the result of a small initial actuating force, but will not operate as a result of jars or other disturbances.

Still another object of the invention is to provide a flotation gear which upon descent of the aircraft upon water will become operative instantaneously and positively.

Another object of the invention is to provide a flotation gear which will afford the maximum exchangeability of integral parts.

In the prefered form of the invention a buoyant fluid is confined in a pressure container by means of a closure held in place by a frangible member adapted to be fractured by a device set in operation upon the aircraft alighting on water, the closure being then opened by the pressure of the confined medium.

While the apparatus in accordance with the present invention is generally similar to that described in my co-pending application Serial No. 182,750 filed December 31, 1937 entitled Flotation system for aircraft, it will be found to differ therefrom more particularly in the provision of novel means for automatically and positively releasing the buoyant fluid medium from its container.

Further objects and features of the invention, not specifically enumerated above, will be apparent as the invention is described in greater detail in connection with the accompanying drawings, wherein:

Figure 1 is a plan view showing flotation equipment constructed in accordance with the present invention and applied to an aeroplane which is indicated in dot and dash lines.

Figure 2 is a view in side elevation showing the equipment of Figure 1 and likewise the aeroplane upon which it is installed, the aeroplane being shown in dot and dash lines.

Figure 4 is a view, also partly in section, of the subject of Figure 3 turned on its vertical axis by 90°, this view showing details of construction in several planes.

Figure 5 is a sectional view of an actuator adapted to be used in connection with the present invention and providing means for enabling the static pressure of a comparatively low head of water to be utilized to actuate the tripping mechanism described hereinafter.

Figure 3:
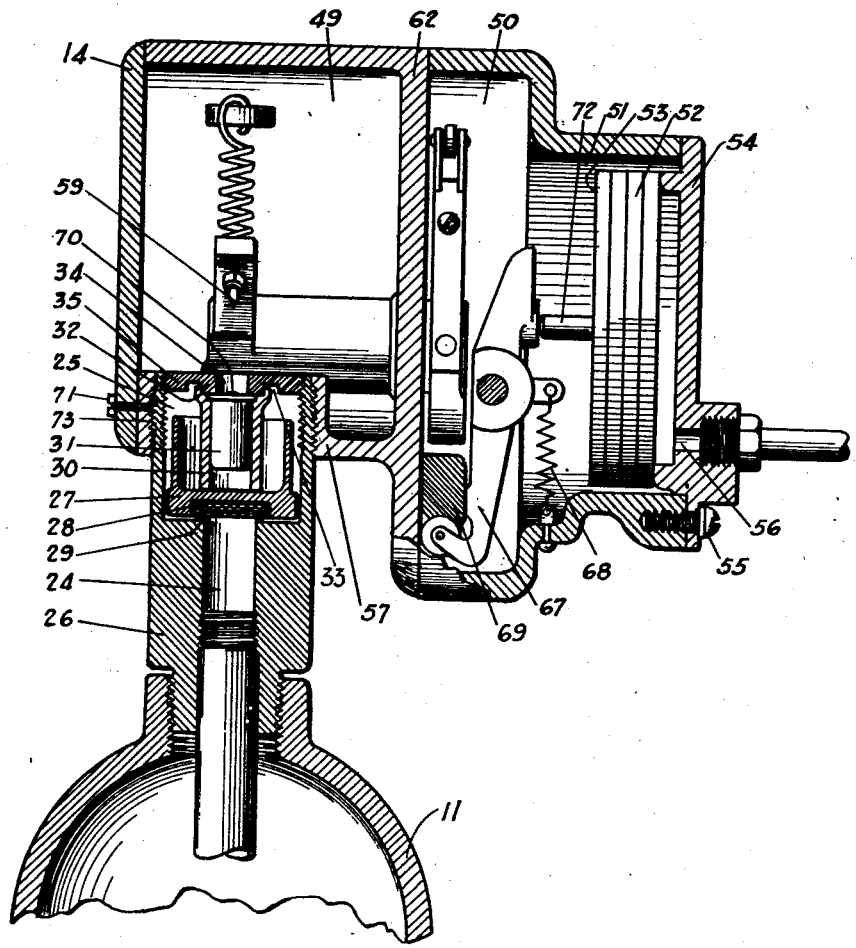
Figure 3 is a view partly in transverse section, showing a container and its releasing mechanism in accordance with the present invention, the section being taken on the line 3—3 of Figure 4 and looking in the direction of the arrows.

Referring to Figures 1 and 2 of the above drawings, an aeroplane fuselage is indicated at 1, and the wing of the aeroplane at 2. On the underneath side of the wing and within the streamline of the wing are set flotation bag containers 2, each containing a normally deflated flotation bag retained within the container by means of wires 4 which pass through ringlets 5 to maintain the cover of each container closed. In order that the flotation bags may be secured effectively to the plane, rope loops are secured to the bags and in turn to the structure of the wing of the plane. A cable or rod 6 operates all of the wires 4 to disengage the ringlets 5, thus enabling a container 3 to be opened. When, therefore, a flotation bag is inflated by a compressed fluid, such as air or carbon dioxide, the bag expands and frees itself from the container, the cover being so constructed as to permit the bag to assume its inflated position. For the purpose of expanding the flotation bags, conduits 8 and 9 are connected to the respective bags, the conduits being connected to an outlet of the pressure medium container 11.

The pressure medium container 11 is provided with a releasing mechanism 14, described in detail hereinafter, the mechanism being actuated by pressure developed upon immersion in water of one of the actuator members 15 or 16, the operating pressure being transmitted to the releasing mechanism of the container through either the tube 17 or the tube 18, both of which are connected to the pressure inlet connection 19 through a special fitting 20, forming no part of the present invention, which fitting prevents pressure developed by the actuator 15 from escaping through the actuator 16, at the same time preventing pressure developed by the actuator 16 from escaping through the actuator 15.

Upon release of the medium within the pressure medium container 11, it passes through discharge lines 21 and 21' into one end of piston bag releases 22 and 22', driving the pistons toward the right, as viewed in Figures 1 and 2, and disengaging the wires 4 from the ringlets 5. When the pistons in piston bag releases 22 and 22' reach the end of their stroke, the medium escapes through conduits 23 and 25, check valves 24, and conduits 8 and 9 into the flotation bags, thus causing them to expand in accordance with the pressure of the medium. During the inflation of the bags, the covers of the containers 3, containing such bags, lift so as to permit the free inflation of the bags. By providing a check valve as indicated at 24, the medium which has expanded into the flotation bags is prevented from escaping therefrom, continued passage of the medium into the bags being freely permitted.

Referring now to Figures 3 and 4 of the drawings, a container 11 is provided, within which a supply of a medium under pressure, usually compressed carbonic acid, is maintained by means of a valve body 26, having a central outlet passage 24 and, in a chamber-recess 25 of the valve body, a cup-shaped metallic closure member 27, which is adapted to receive a non-metallic closure disc 28 on its lower side to form a valve head seated on a seat 29 in the central outlet passage 24 of the valve body 26. Centrally located within the cup of closure member 27 is a hollow supporting cylinder 30, made of some brittle though thrust withstanding material, e. g., Bakelite, clay, porcelain, or the like, carrying within its hollow a downwardly suspended blank cartridge 31. The chamber-recess 25 of the valve body 26 is closed by a threaded closure plug 35, which, by means of an annular flange 32 formed by an annular recess 33 on its lower side, takes up the thrust of the widened upper end of hollow cylinder 30 and serves to clamp the cartridge in place, while its central bore 34 exposes the percussion point 70 of the cartridge 31 to the detonating action of firing pin 59. The boss 44, formed on the valve body 26, is centrally bored to form an escape passage 45 for the gas in container 11, threads 46 providing for attachment of an outlet conduit, while the recoil preventing outlet plug 47 threaded into passage 45 serves to eliminate any recoil effect due to the escape of the high pressure medium at a time when the outlet conduit (not shown in Figures 3 and 4) is removed, the passages 48 serving to produce opposed balanced jets of the pressure medium.

The release actuating mechanism 14 is shown threadedly secured at 73 as a unit to the top of valve body 26, in which 49 is a cartridge chamber, 50 a lever chamber, and 51 an extension of the lever chamber containing a bellows-like member 52 provided with a closed end 53 and supported on its open end by means of an airtight connection with the closing member 54, secured to lever-chamber extension 51 by screws 55, the member 52 carrying the actuating pin 72. A passage 56 in the member 54 communicates with the interior of the bellows-like member 52 and is adapted to be connected to the actuators 15 and 16, as already described. Set screw 71 serves to maintain in a fixed relation the threaded cooperation between valve body 26 and release housing 14.

Mounted within one corner of the cartridge chamber 49 is a boss 57 bored out to receive the upper portion of valve body 26, referred to above. A lever 58 carrying a firing pin 59 which is adapted to detonatingly strike the blank cartridge 31 secured within valve body 26, is mounted on a spindle 60 by means of a set screw 61, the spindle passing through the wall 62 between the cartridge chamber 49 and the lever chamber 50 into the lever chamber. A relatively heavy coiled tension spring 63 is arranged to engage a lug 64 on the lever 58 and another lug 65 mounted on a side wall of the cartridge chamber, the tendency of the spring 63 being to normally urge rotation of the lever 58 in a clockwise direction as viewed in Figure 4.

In order to normally restrain rotation of the lever 58, a lever system is provided in the lever chamber 50, the first lever of the system being shown at 66, said lever being secured to the end of the spindle 60 projecting within the lever chamber, and the last lever of the system being shown at 67, a coiled spring 68 tending to maintain the lever 67 normally in engagement with the lever 69. The details of the lever system itself do not form a part of the invention and inasmuch as any suitable lever system may be employed, so long as it serves to reduce by successive steps the amount of force required to release the spring energized lever 58, the various parts of the present lever system will not be gone into. Suffice it to say that in mechanisms of this character, it is highly desirable that the elements thereof be responsive to extremely slight differences of pressure, such as a six-inch head of water.

The specific form of actuator which has been found to be highly effective in systems of this character is illustrated in Figure 5. It is desirable that the actuators be connected to the pressure responsive chamber by a length of small diameter small bore tubing. The difficulty heretofore encountered in transmitting the actuating pressure to the actuating mechanism by simply dipping the small bore tubing into water has been overcome by the present construction. Due to the small bore of the tubing, there is a tendency to retard the entry of the water into the tubing with the result that the tubing must be immersed to a much greater depth than desired before actuation of the mechanism can be accomplished. In this connection, it will be understood that the actuating fluid does not itself normally reach the pressure responsible chamber, but in the case of a liquid actuating fluid, the pressure is transmitted to the pressure responsive chamber by compression of the air normally contained therein and in the tubing leading to the chamber.

To overcome the resistance to the flow of the liquid in the small bore tubing, an actuator barrel 94 has been provided which is of considerably larger diameter than the small bore tubing. The actuator barrel is connected to the tubing by a coupling member 95 and is substantially closed at the other end by means of a cap 96. Perforations 98 are formed in the barrel 94 and adjacent the end to which the cap 96 is secured. It is preferred that the perforations do not extend to the fitting 95 in order that a chamber may be provided adjacent this end of the actuator in which a pressure may be produced by the head of the liquid in which the actuator is immersed. The reason for capping the lower end of the barrel is to prevent actuation of the bellows due to a pressure wave caused by the barrel being placed in a rapidly moving air stream such, for example, as would be encountered if the barrel were pointed toward the nose of an aeroplane. The cap 96 is provided with radial openings 97 for draining any water which collects within the barrel and, inasmuch as these openings are radial, the wind pressure exteriorly of the barrel will not be transmitted to the interior thereof. The perforations 98 are so formed as to prevent the transmission of pressure waves to the actuating mechanism due to wind pressure externally of the barrel. To this effect, the axes of the perforations preferably lie perpendicular to the axis of the barrel.

While the manner of operation of the flotation gear in accordance with the present invention is not difficult to understand, it is nevertheless pointed out that, upon immersion of either the actuator 15 or the actuator 16 in water, a volume of air is trapped in the actuator and in the tubing connecting the actuator to the releasing unit 14. The pressure of the volume of air so trapped serves to move the bellows-like member 52 toward the left, as viewed in Figure 3, carrying with it the pin 72, which presses against one end of the lever 67 and causes it to disengage the lever system. When this occurs, the lever 58 rotates rapidly under the influence of the spring 63 and causes the firing pin 59 to strike the percussion cap 70 with considerable force, the detonating cap setting off the charge of explosive powder within the cartridge 31, the high pressure of the explosive gases causing the supporting cylinder 30 to be shattered, permitting now the pressure of the fluid medium in container 11 to lift the cup-shaped closure member 27 until the upper edge of the cup meets the nether side of closure plug 35. The medium under pressure in the container is now free to escape via escape passages 45 and 48 to the conduits 21 and 21', causing the inflatable bags to be released by piston bag releases 22 and 22' and to be inflated to form buoyant floats, thus preventing the aircraft from sinking. This, of course, also holds true should the aircraft descend into the water in an inverted position.

It will be seen that for the system to be made operable again, a replacement will have to be made of the carriage 31 and supporting cylinder 30, while the releasing lever mechanism has to be reset. The above will serve to illustrate how the main objects as mentioned above have been accomplished, especially as to utilizing the pressure of the fluid medium in the releasing operation, and the simplification and reduction in cost of the gear, without impairing other objects such as the necessity of replacement parts.

It will, of course, be readily apparent that the present invention is adaptable for other purposes than in connection with aircraft flotation.

From the foregoing description, it will be seen that I have provided a simple and effective means for releasing pressure fluid medium from one or more containers thereof, where only a small initial operating force is available, and it will be further seen that my invention accomplishes the various objects pointed out at the beginning of this specification. Finally, while my invention resides in certain principles of construction and operation which have been illustrated and described in connection with the accompanying drawings, it will be apparent to those skilled in the art that the invention may be embodied in other forms of construction without departing in any manner from the spirit and scope of the invention, and I therefore do not wish to be strictly limited to the disclosure, but rather to the scope of the appended claims.

I claim:

1. In a stored pressure fluid medium releasing system, the combination of a container containing a fluid medium, a chambered valve body secured to the container having an outlet, a liftable closure in the valve body confining said fluid medium in the container under pressure, a frangible member in the chambered valve body supporting said closure against the pressure of the fluid medium, an explosive cartridge disposed within the frangible member, and cartridge detonating means secured to the valve body.

2. In combination, a releasing system comprising a pressure medium container, a container closure liftable by pressure, a frangible member supporting said closure, means to fracture the frangible member operatively accessible from outside the frangible member, and means actuate the last named means secured adjacent to said means, thereby to cause an opening of the container.

3. In combination, a releasing system comprising a pressure medium container, a chambered valve body secured to the container, having an valve outlet, a liftable container closure in the valve body, exposed to the pressure of the fluid medium, a frangible member in the chambered valve body supporting said closure, explosive means disposed within the frangible member, adapted to shatter said frangible member, and a mechanism secured to the valve body adapted to strikingly detonate said explosive means, whereby the pressure medium will lift said closure and escape through said outlet.

4. In an exchangeable valved container structure, the combination of a pressure medium container, a chambered valve body threadedly secured to the container, a liftable container closure seated in the valve body, a frangible member in the valve body supporting said closure, and an explosive cartridge within the frangible member exposed so as to be able to be detonatingly struck from the outside.

5. In a valve, the combination of a chambered valve body comprising inlet and outlet passages, a liftable closure member seated in said valve body, a frangible member in the valve body supporting said closure, and an explosive cartridge within said frangible member exposed so as to be able to be detonatingly struck from the outside.

6. In a valve, the combination of a chambered valve body comprising inlet and outlet passages, a liftable valve member seated over the inlet passage of said valve body, a member forming a closure for said valve chamber, a frangible member in the valve body disposed between said chamber closure and the valve member adapted to support said valve member against displacement, and an explosive cartridge within said frangible member exposed through the chamber closure to outside actuation and adapted to shatter said frangible member.

7. In combination, a pressure medium container, a chambered body member secured to the container having inlet and outlet passages, a liftable closure member seated within the chambered body member over the inlet passage, a member forming a closure for said chambered body member, a frangible tube-like member in the chambered body member disposed between the chamber closure and the liftable closure member and adapted to normally support the latter against displacement, and an explosive cartridge within said frangible tube-like member adapted upon actuation to shatter said tube-like member to permit the liftable closure member to raise from its seat.

HARRY C. GRANT, Jr.